(12) United States Patent
Wang et al.

(10) Patent No.: US 11,699,868 B2
(45) Date of Patent: Jul. 11, 2023

(54) PLUGGABLE FREE-SPACE PHOTOELECTRIC HYBRID CONNECTOR

(71) Applicant: HANGZHOU MO-LINK TECHNOLOGY CO. LTD, Hangzhou (CN)

(72) Inventors: Hao Wang, Hangzhou (CN); Qi Chen, Hangzhou (CN); Cheng Zhi Mo, Hangzhou (CN); Hai Tang Qin, Hangzhou (CN)

(73) Assignee: HANGZHOU MO-LINK TECHNOLOGY CO. LTD, Hangzhou (CN)

( * ) Notice: Subject to any disclaimer, the term of this patent is extended or adjusted under 35 U.S.C. 154(b) by 164 days.

(21) Appl. No.: 17/391,153

(22) Filed: Aug. 2, 2021

(65) Prior Publication Data

US 2022/0336977 A1    Oct. 20, 2022

(30) Foreign Application Priority Data

Apr. 20, 2021  (CN) .......................... 202110426788.2

(51) Int. Cl.
  *H01R 12/70*    (2011.01)
  *G02B 6/38*    (2006.01)
  *H01R 12/53*    (2011.01)

(52) U.S. Cl.
  CPC ....... *H01R 12/7023* (2013.01); *G02B 6/3817* (2013.01); *G02B 6/3853* (2013.01); *H01R 12/53* (2013.01)

(58) Field of Classification Search
  None
  See application file for complete search history.

(56) References Cited

U.S. PATENT DOCUMENTS

| | | | | |
|---|---|---|---|---|
| 5,419,717 A * | 5/1995 | Abendschein | ....... | G02B 6/3897 385/139 |
| 6,368,150 B1 * | 4/2002 | Zheng | ................. | H01R 13/518 385/75 |
| 7,402,078 B2 * | 7/2008 | Wan | ................... | H01R 13/6594 439/607.17 |
| 8,292,516 B2 * | 10/2012 | Little | .................. | G02B 6/3817 385/76 |
| 8,475,218 B2 * | 7/2013 | Zheng | ................. | G02B 6/4292 439/660 |

(Continued)

*Primary Examiner* — Jerry Rahll
(74) *Attorney, Agent, or Firm* — Li & Cai Intellectual Property (USA) Office

(57) ABSTRACT

A pluggable free-space photoelectric hybrid connector including a female connector and a male connector is provided. The female connector includes a first insulating substrate, metal elastic clips, a first circuit board, and a first optical communication module. An insertion cavity is formed at the front end of the first insulating substrate, and a first fiber mounting hole and first electrode mounting holes are formed at the rear end thereof. The metal elastic clips are mounted in the first electrode mounting holes respectively, where contact portions of at least one set of metal elastic clips are exposed from the top of the insertion cavity, and contact portions of at least another set of metal elastic clips are exposed from the bottom of the insertion cavity. The first circuit board is mounted at the rear end of the first insulating substrate and is electrically connected to the metal elastic clips.

12 Claims, 10 Drawing Sheets

(56) References Cited

U.S. PATENT DOCUMENTS

| | | | | |
|---|---|---|---|---|
| 8,814,443 | B2* | 8/2014 | He | G02B 6/3897 |
| | | | | 385/75 |
| 9,285,552 | B2* | 3/2016 | Marcouiller | G02B 6/3879 |
| 2007/0155240 | A1* | 7/2007 | Wan | H01R 13/6594 |
| | | | | 439/607.01 |
| 2008/0026640 | A1* | 1/2008 | Zheng | H01R 13/642 |
| | | | | 439/626 |
| 2010/0254661 | A1* | 10/2010 | Sun | H01R 12/712 |
| | | | | 385/75 |
| 2010/0303421 | A1* | 12/2010 | He | G02B 6/3817 |
| | | | | 385/75 |
| 2010/0322570 | A1* | 12/2010 | Zheng | H01R 13/658 |
| | | | | 385/93 |
| 2011/0085766 | A1* | 4/2011 | Liao | G02B 6/3817 |
| | | | | 385/71 |
| 2011/0091160 | A1* | 4/2011 | He | G02B 6/4261 |
| | | | | 385/74 |
| 2011/0091162 | A1* | 4/2011 | He | G02B 6/4284 |
| | | | | 385/75 |
| 2011/0176778 | A1* | 7/2011 | Little | G02B 6/3817 |
| | | | | 385/76 |
| 2011/0268396 | A1* | 11/2011 | He | G02B 6/3817 |
| | | | | 385/92 |
| 2012/0082421 | A1* | 4/2012 | Hsu | G02B 6/3897 |
| | | | | 385/92 |
| 2012/0149244 | A1* | 6/2012 | Zheng | G02B 6/4292 |
| | | | | 439/658 |
| 2021/0104835 | A1* | 4/2021 | Takayanagi | H01R 13/6585 |

* cited by examiner (A-A)

(B-B)

PLUGGABLE FREE-SPACE PHOTOELECTRIC HYBRID CONNECTOR

FIELD OF THE DISCLOSURE

The present disclosure relates to the field of communications technologies, and in particular, to a pluggable free-space photoelectric hybrid connector.

BACKGROUND OF THE DISCLOSURE

In the communication field, especially, for signal transmission in the field of consumer products, such as laptops, computers, TVs, cell phones and other smart terminals, copper wires are always used in conventional applications to transmit signals and data. In order to meet the increasingly growing transmission capacity and high-speed transmission requirement, the inventor has invented a communication method that replaces traditional cables, and has filed the following Chinese patent applications successively: 1. COMMUNICATION TERMINAL BASED ON FREE SPACE OPTICAL COMMUNICATION, COMMUNICATION DEVICE AND COMMUNICATION SYSTEM, with the publication No. CN109586790A, and 2. OPTICAL FIBER CONNECTION OPTICAL COMPONENT, with the publication No. CN110780391A.

Based on the foregoing applications, the inventor conducts further research and provides a pluggable free-space photoelectric hybrid connector.

SUMMARY OF THE DISCLOSURE

The present disclosure aims to provide a pluggable free-space photoelectric hybrid connector which has high processing yield and high reliability, and is easy to use.

To achieve the foregoing objective, the present disclosure adopts the following technical solutions:

The pluggable free-space photoelectric hybrid connector of the present disclosure consists of a male connector and a female connector which are used in cooperation.

A pluggable free-space photoelectric hybrid female connector includes:

a first insulating substrate, where an insertion cavity is formed at its front end, and a first fiber mounting hole and first electrode mounting holes are formed at its rear end;

multiple sets of metal elastic clips, mounted in the first electrode mounting holes respectively, where contact portions of at least one set of metal elastic clips are exposed from the top of the insertion cavity, and contact portions of at least another set of metal elastic clips are exposed from the bottom of the insertion cavity;

a first circuit board, mounted at the rear end of the first insulating substrate and electrically connected to the multiple sets of metal elastic clips; and a first optical communication module, which includes:

a first optical fiber connector disposed in the first fiber mounting hole and used to carry optical fibers; and a first lens disposed at the back side of the insertion cavity, opposite to a light-emitting end of the first optical fiber connector, and used to perform expansion processing on light beams transmitted from the female connector to a male connector, where the position of the first lens is arranged in such a manner that there is a distance between the first lens and a second lens of the male connector when the female connector and the male connector are in an insertion-connected state.

In the foregoing female connector, preferably, a first metal housing is sleeved outside the first insulating substrate, and is disposed with a fastening portion; and the fastening portion is designed in such a manner that the fastening portion and the male connector are fastened and fitted together in the insertion-connected state, so that the male connector and the female connector maintain the insertion-connected state.

In the foregoing female connector, preferably, an insulating piece is disposed at the middle of each set of the metal elastic clips, and is insertion-fitted into the corresponding first electrode mounting hole, so that the metal elastic clips are mounted in the first electrode mounting hole. The metal elastic clips are further preferably combined onto the first insulating substrate by means of in-mold injection.

In the foregoing female connector, preferably, the rear end of each insulating piece and the rear end of the first optical fiber connector are both pressed against the first circuit board.

In the foregoing female connector, preferably, a groove extending in a plugging direction is further disposed at the top and/or the bottom of the insertion cavity.

In the foregoing female connector, preferably, the first lens includes one or more lenses integrally formed with the first insulating substrate.

A pluggable free-space photoelectric hybrid male connector includes:

a second insulating substrate, where an insertion protrusion is formed at its front end and a second fiber mounting hole and second electrode mounting holes are formed at its rear end; and the insertion protrusion is designed to match an insertion cavity of a corresponding female connector;

multiple sets of metal pins, mounted in the second electrode mounting holes respectively, where contact portions of at least one set of metal pins are exposed from the top of the insertion protrusion, and contact portions of at least another set of metal pins are exposed from the bottom of the insertion protrusion;

a second circuit board, mounted at the rear end of the second insulating substrate and electrically connected to the multiple sets of metal pins; and a second optical communication module, which includes:

a second optical fiber connector disposed in the second fiber mounting hole and used to carry optical fibers; and a second lens disposed at the front side of the insertion protrusion, opposite to a light-emitting end of the second optical fiber connector, and used to perform expansion processing on light beams transmitted from the male connector to the female connector, where the position of the second lens is arranged in such a manner that there is a distance between the second lens and a first lens of the female connector when the male connector and the female connector are in an insertion-connected state.

In the foregoing male connector, preferably, a second metal housing is sleeved outside the second insulating substrate, and is disposed with a fastening fit portion; and the fastening fit portion is designed to match a fastening portion on a first metal housing of the corresponding female connector.

In the foregoing male connector, preferably, an insulating piece is disposed at the middle of each set of the metal pins, and is insertion-fitted into the corresponding second electrode mounting hole, so that the metal pins are mounted in the second electrode mounting hole. The metal pins are further preferably combined onto the second insulating substrate by means of in-mold injection.

In the foregoing male connector, preferably, the rear end of each insulating piece and the rear end of the second optical fiber connector are both pressed against the second circuit board.

In the foregoing male connector, preferably, a projection extending in a plugging direction is further disposed at the top and/or the bottom of the insertion protrusion, and is designed to match a groove at the top and/or the bottom of an insertion cavity of the corresponding female connector.

In the foregoing male connector, preferably, the second lens includes one or more lenses integrally formed with the second insulating substrate.

Compared to the prior art, the present disclosure at least has the following beneficial effects:

Both optical signals and electrical signals can be transmitted.

The female connector and the male connector are optically connected through free space, and are both arranged with a lens for expanding light beams transmitted to each other. In this way, a light path is highly tolerant of dimensional tolerances and contaminants, so that the connector has high processing yield and high reliability.

Metal elastic clips are used as electrodes to implement electrical signal transmission, and the top and bottom of the insertion cavity are both disposed with the metal elastic clips, such that multiple sets of electrical signals can be transmitted. Moreover, the metal elastic clips on the top and bottom produce an elastic force of firmly clamping the male connector from the top and bottom two directions, which can prevent the male connector from shaking in the female connector, thus improving transmission stability of the optical and electrical signals.

The metal housing is further provided, which, on one hand, can shield interference signals. On the other hand, the fastening portion and the fastening fit portion on the metal housing can make the male connector and the female connector maintain an insertion-connected state, thus avoiding unstable signals due to a loose fit between the insertion cavity and the insertion protrusion.

A groove and a projection that fit into each other are respectively disposed at the top and/or the bottom of the insertion cavity, and the top and/or the bottom of the insertion protrusion. During insertion, the lens of the male connector and that of the female connector can be precisely aligned by auxiliary guidance.

The lens is directly formed on the insulating substrate of the connector, thus having the features of a small mounting error and a simple connector assembly process. The metal elastic clips and the metal pins serving as electrical connection parts are combined on the insulating substrate of the connector by means of overall insertion-fit or in-mold injection, thus further simplifying the assembly process of the connector.

Figure 1:
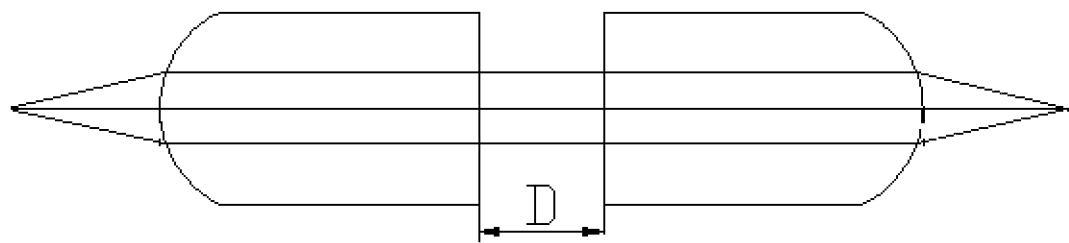
FIG. 1 is a schematic structural diagram of a light path between optical communication modules.
Figure 2:
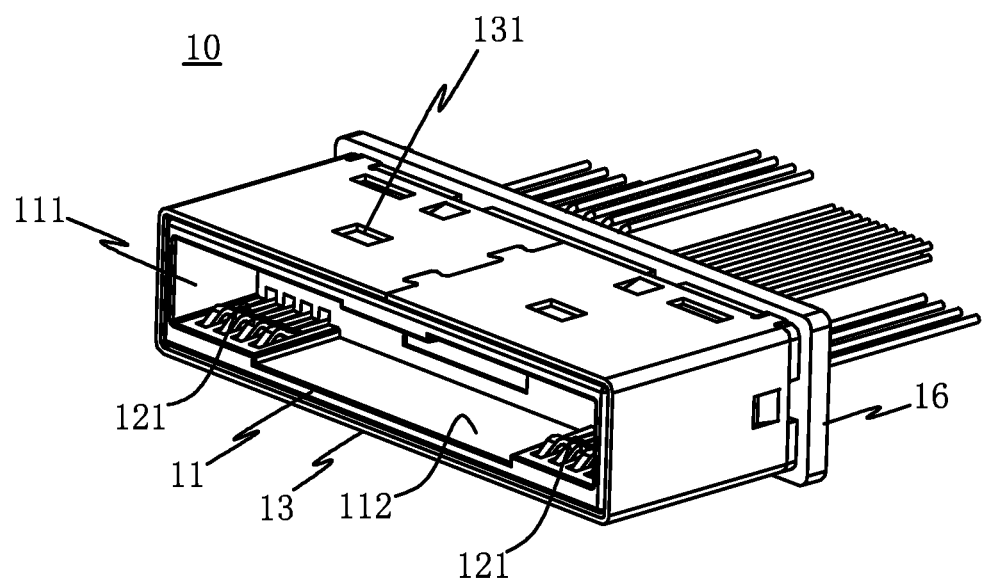
FIG. 2 is a three-dimensional diagram of a female connector.
Figure 3:
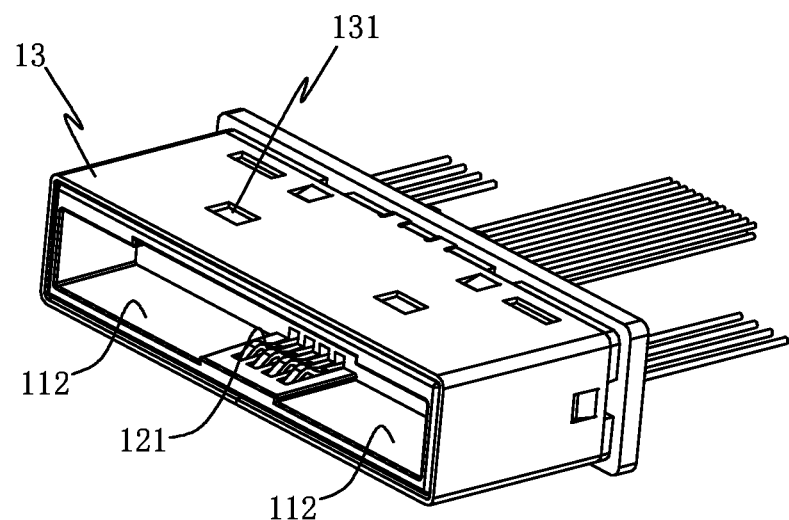
FIG. 3 is a three-dimensional diagram of the female connector from another viewing angle.
Figure 4:
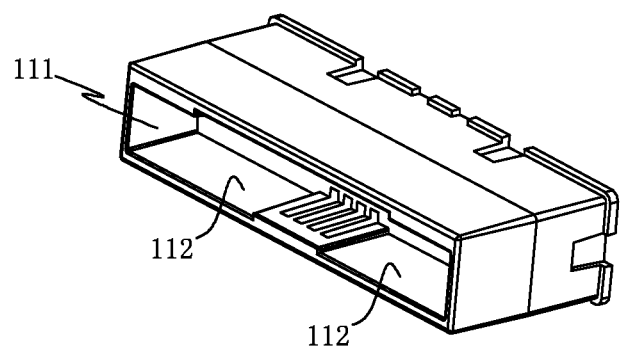
FIG. 4 is a three-dimensional diagram of a first insulating substrate.
Figure 5:
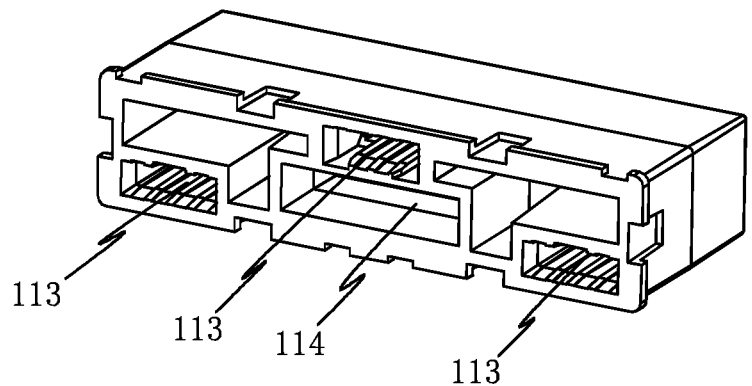
FIG. 5 is a three-dimensional diagram of the first insulating substrate from another viewing angle.

| Reference numeral: | | | |
|---|---|---|---|
| Female connector | 10 | | |
| Male connector | 20 | First insulating substrate | 11 |
| Distance | D | Insertion cavity | 111 |
| Groove | 112 | First electrode mounting hole | 113 |
| First fiber mounting hole | 114 | Metal elastic sheet | 12 |
| Insulating piece | 122 | First metal housing | 13 |
| Fastening portion | 131 | First optical fiber connector | 141 |
| First lens | 142 | Optical fiber | 15 |
| First circuit board | 16 | Second insulating substrate | 21 |
| Insertion protrusion | 211 | Projection | 212 |
| Second electrode mounting hole | 213 | Second fiber mounting hole | 214 |
| Metal pin | 22 | Second metal housing | 23 |
| Fastening fit portion | 231 | Second optical fiber connector | 241 |
| Second lens | 242 | Second circuit board | 25 |

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is further described below with reference to the accompanying drawings and specific embodiments.

FIG. 1 is a schematic structural diagram of a light path between optical communication modules, where D denotes a distance between two lenses (lenses of a male connector and a female connector) and the distance is used for realizing optical signal connection in free space.

First Embodiment

A pluggable free-space photoelectric hybrid female connector 10 is provided, which is briefly referred to as a female connector in some situations of the present application for ease of description.

Referring to FIGS. 2 to 8. The female connector 10 includes a first insulating substrate 11, three sets of metal elastic clips 12, a first circuit board 16, a first optical communication module, and a first metal housing 13.

The first insulating substrate 11 is wholly a cuboid structure, where an insertion cavity 111 is formed at its front end, and a first fiber mounting hole 114 and three first electrode mounting holes 113 are formed at its rear end. The first fiber mounting hole 114 is located at the middle of the rear end; and the three first electrode mounting holes 113 are distributed in a triangle form, and extend to the top and the bottom of the insertion cavity 111.

The three sets of metal elastic clips 12 are mounted in the three first electrode mounting holes 113 of the first insulating substrate 11 respectively, where contact portions 121 of one set of metal elastic clips 12 are exposed from the top of the insertion cavity 111, and contact portions 121 of the remaining two sets of metal elastic clips 12 are exposed from the bottom of the insertion cavity 111.

The first optical communication module includes: a first optical fiber connector 141 disposed in the first fiber mounting hole 114 and used to carry optical fibers; and a first lens 142 disposed at the back side of the insertion cavity 111, opposite to a light-emitting end of the first optical fiber connector 141, and used to perform expansion processing on light beams transmitted from the female connector 10 to a male connector 20. The position of the first lens 142 is arranged in such a manner that there is a distance D between the first lens 142 and a second lens 242 of the male connector 20 when the female connector 10 and the male connector 20 are in an insertion-connected state. The first lens 142 is formed at the back side of the insertion cavity 111. The first optical fiber connector 141 is insertion-fitted into the first fiber mounting hole 114. By precise size control, it is ensured that the core of the optical fiber is aligned with the center of the optical axis of the first lens 142, with a typical tolerance of 10 μM.

The first metal housing 13 is sleeved outside the first insulating substrate 11 and they are assembled together by a fastening structure. The first metal housing 13 is disposed with a fastening portion 131 which is specifically a fastening hole on the surface. The fastening portion 131 is designed in such a manner that the fastening portion 131 and the male connector 20 are fastened and fitted together after the female connector 10 and the corresponding male connector 20 are insertion-connected, so that the male connector 20 and the female connector 10 maintain an insertion-connected state.

The first circuit board 16 is mounted at the rear end of the first insulating substrate 11; and the three sets of metal elastic clips 12 and the first metal housing 13 are all welded to the first circuit board.

Figure 7:
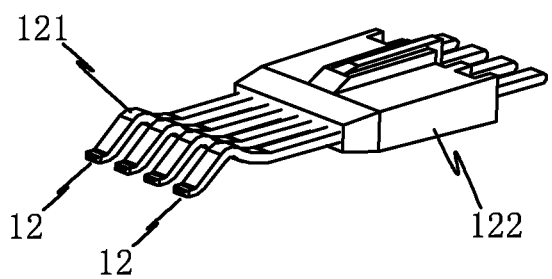
FIG. 7 is a schematic diagram of a metal elastic sheet assembly.

FIG. 7 shows a structure of a metal elastic sheet assembly. As shown in FIG. 7, the metal elastic sheet assembly includes four metal elastic clips 12, and an insulating piece 122 is injection-molded at the middle of the metal elastic clips 12, so that the four metal elastic clips 12 are connected into one assembly via the insulating piece 122. Each metal elastic sheet assembly is used to receive or send a set of electrical signals. By an insertion fit between the insulating piece 122 and the corresponding first electrode mounting hole 113, the metal elastic clips 12 can be mounted in the first electrode mounting hole 113. Compared to a method of mounting metal electrodes onto the first insulating substrate 11 one by one, such a modular mounting manner is characterized by good consistency and a simple assembly process. As another preferred implementation, the metal elastic clips 12 may be combined to the first insulating substrate 11 by means of in-mold injection.

The rear end of each insulating piece 122 and the rear end of the first optical fiber connector 141 are both pressed against the first circuit board 16, and the first circuit board 16 can prevent the first optical fiber connector 141 and the metal elastic clips 12 from moving backwards.

A groove 112 extending in a plugging direction is further disposed separately at the top and the bottom of the insertion cavity 111.

Figure 8:
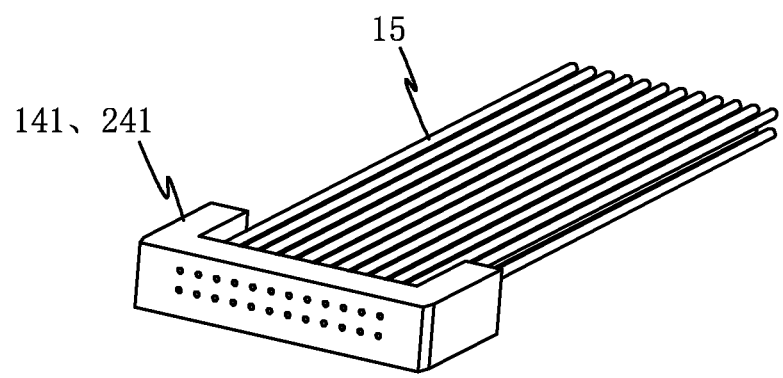
FIG. 8 is a schematic diagram of a first optical fiber connector.
Figure 9:
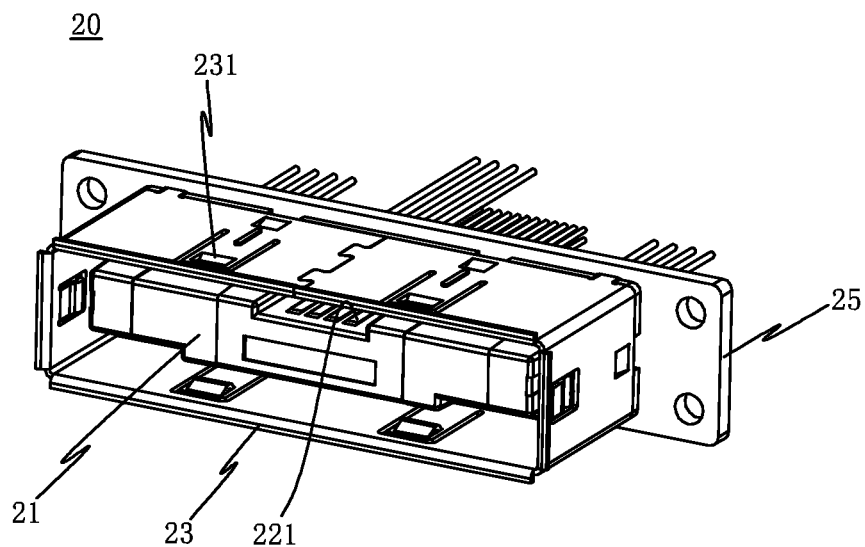
FIG. 9 is a three-dimensional diagram of a male connector.
Figure 10:
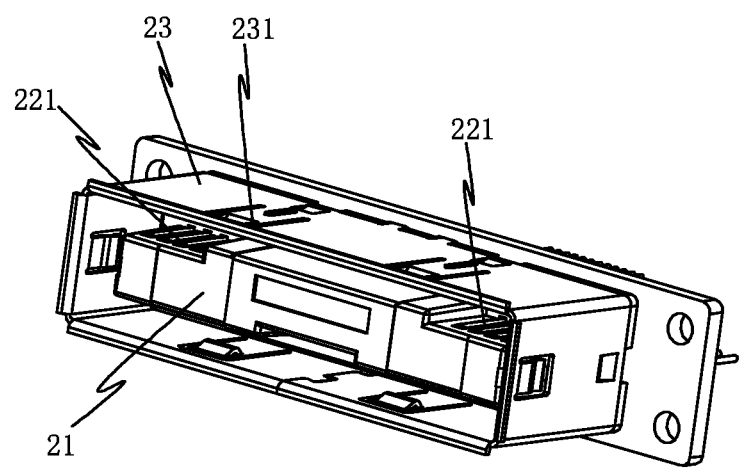
FIG. 10 is a three-dimensional diagram of the male connector from another viewing angle.

FIG. 8 shows a structure of the first optical fiber connector 141. The first optical fiber connector 141 in this embodiment is arranged with two rows of fiber holes, where there are 12 fiber holes in each row and a fiber spacing is 0.5 mm with a tolerance of 5 μm.

Figure 6:
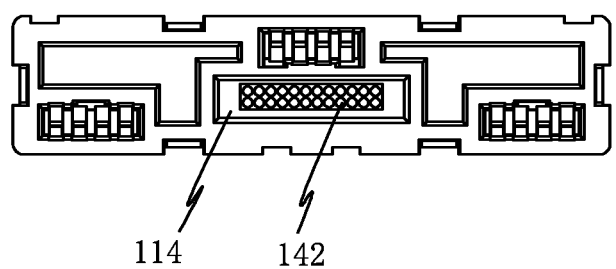
FIG. 6 is a schematic diagram of a first lens.

FIG. 6 shows the first lens 142. In this embodiment, the first lens 142 is formed by a plurality of lenses integrally formed with the first insulating substrate 11. A specific number of the lenses is identical with the number of the optical fibers, and further the lenses and the fibers are arranged at corresponding positions. During specific implementation, a transparent insulating material, such as plastic, acrylic, or glass, is used to fabricate the first insulating substrate 11 with the first lens 142 by a molding process; and moreover, a region on the first insulating substrate 11 other than the first lens 142 may be coated with a light-shielding layer. Such a design does not require alignment and combination of the first lens 142 and the first insulating substrate 11, thus having the features of a small mounting error and a simple assembly process.

Second Embodiment

A pluggable free-space photoelectric hybrid male connector 20 is provided, which is briefly referred to as a male connector 20 in some situations of the present application for ease of description.

Referring to FIGS. 9 to 14, the male connector 20 includes a second insulating substrate 21, three sets of metal pins 22, a second circuit board 25, a second optical communication module, and a second metal housing 23.

An insertion protrusion 211 is formed at the front end of the second insulating substrate 21, and is designed to match the insertion cavity 111 of the female connector 10 in the first embodiment. A second fiber mounting hole 214 and three second electrode mounting holes 213 are formed at the rear end of the second insulating substrate 21, where the second fiber mounting hole 214 is located at the middle of the rear end and the three second electrode mounting holes 213 are distributed in a triangle form.

The three sets of metal pins 22 are mounted in the three second electrode mounting holes 213 of the second insulating substrate 21 respectively, where contact portions 221 of one set of metal pins 22 are exposed from the top of the insertion protrusion 211, and contact portions 221 of the remaining two sets of metal pins 12 are exposed from the bottom of the insertion protrusion 211.

The second optical communication module includes: a second optical fiber connector 241 (referring to FIG. 8) disposed in the second fiber mounting hole 214 and used to carry optical fibers; and a second lens 242 disposed at the front side of the insertion protrusion 211, opposite to a light-emitting end of the second optical fiber connector 241, and used to perform expansion processing on light beams transmitted from the male connector 20 to the female connector 10. The position of the second lens 242 is arranged in such a manner that there is a distance D between the second lens 242 and the first lens 142 of the female connector 10 when the male connector 20 and the female connector 10 are in an insertion-connected state. The second lens 242 is formed at the front side of the insertion protrusion 211.

The second metal housing 23 is sleeved outside the second insulating substrate 21 and they are assembled together by a fastening structure. The second metal housing 23 is disposed with a fastening fit portion 231 which is designed to match the fastening portion 131 on the first metal housing 13 of the female connector 10 in the first embodiment. The fastening fit portion 231 is a fastening bar.

The second circuit board 25 is mounted at the rear end of the second insulating substrate 21; and the three sets of metal pins 22 and the second metal housing 23 are all welded to the second circuit board 25.

Figure 11:
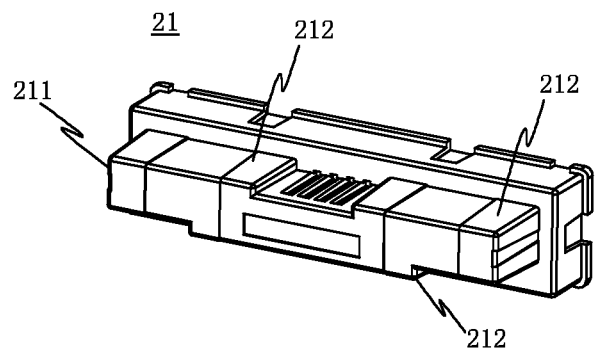
FIG. 11 is a three-dimensional diagram of a second insulating substrate.
Figure 12:
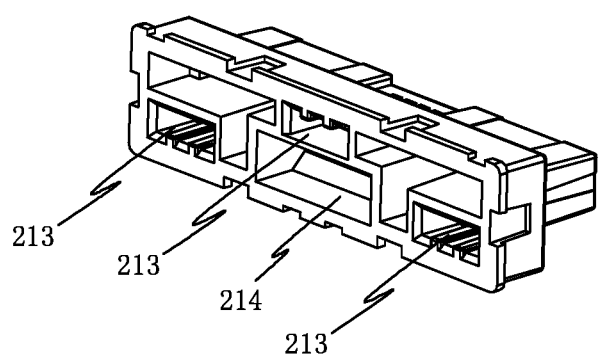
FIG. 12 is a three-dimensional diagram of the second insulating substrate from another viewing angle.

FIG. 11 shows a structure of a metal pin assembly. As shown in FIG. 11, the metal pin assembly includes four metal pins 22, and an insulating piece 122 is injection-molded at the middle of the metal pins 22, so that the four metal pins 22 are connected into one assembly via the insulating piece 122. Each metal pin assembly is used to receive or send a set of electrical signals. By an insertion fit between the insulating piece 122 and the corresponding second electrode mounting hole 213 on the second insulating substrate 21, the metal pins 22 can be mounted in the second electrode mounting hole 213. Compared to a method of mounting the metal pins 22 onto the second insulating substrate 21 one by one, such a modular mounting manner is characterized by good consistency and a simple assembly process. As another preferred implementation, the metal pins 22 may be combined to the second insulating substrate 21 by means of in-mold injection.

The rear end of each insulating piece 122 and the rear end of the second optical fiber connector 241 are both pressed against the second circuit board 25, and the second circuit board 25 can prevent the second optical fiber connector 241 and the metal pins 22 from moving backwards.

A projection 212 extending in a plugging direction is further disposed separately at the top and the bottom of the insertion protrusion 211, and is designed to match the grooves 112 at the top and the bottom of the insertion cavity 111 of the female connector 10 in the first embodiment.

Figure 13:
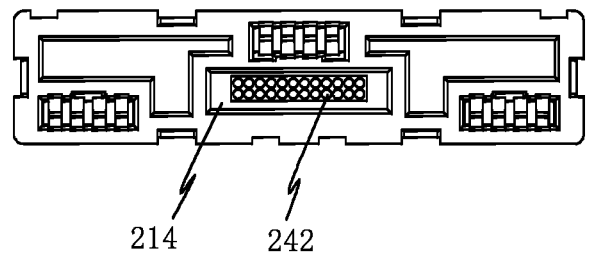
FIG. 13 is a schematic diagram of a second lens.
Figure 14:
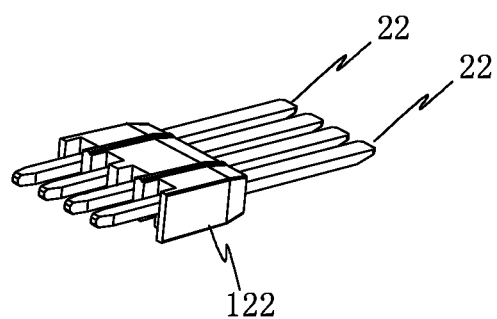
FIG. 14 is a schematic diagram of a metal pin assembly.

FIG. 13 shows the second lens 242. In this embodiment, the second lens 242 is formed by a plurality of lenses integrally formed with the second insulating substrate 21. A specific number of the lenses is identical with the number of the optical fibers, and further the lenses and the fibers are arranged at corresponding positions. During specific implementation, a transparent insulating material, such as plastic, acrylic, or glass, is used to fabricate the second insulating substrate 21 with the second lens 242 by a molding process; and moreover, a region on the second insulating substrate 21 other than the second lens 242 may be coated with a light-shielding layer. Such a design does not require alignment and combination of the second lens 242 and the second insulating substrate 21, thus having the features of a small mounting error and a simple assembly process.

Figure 15:
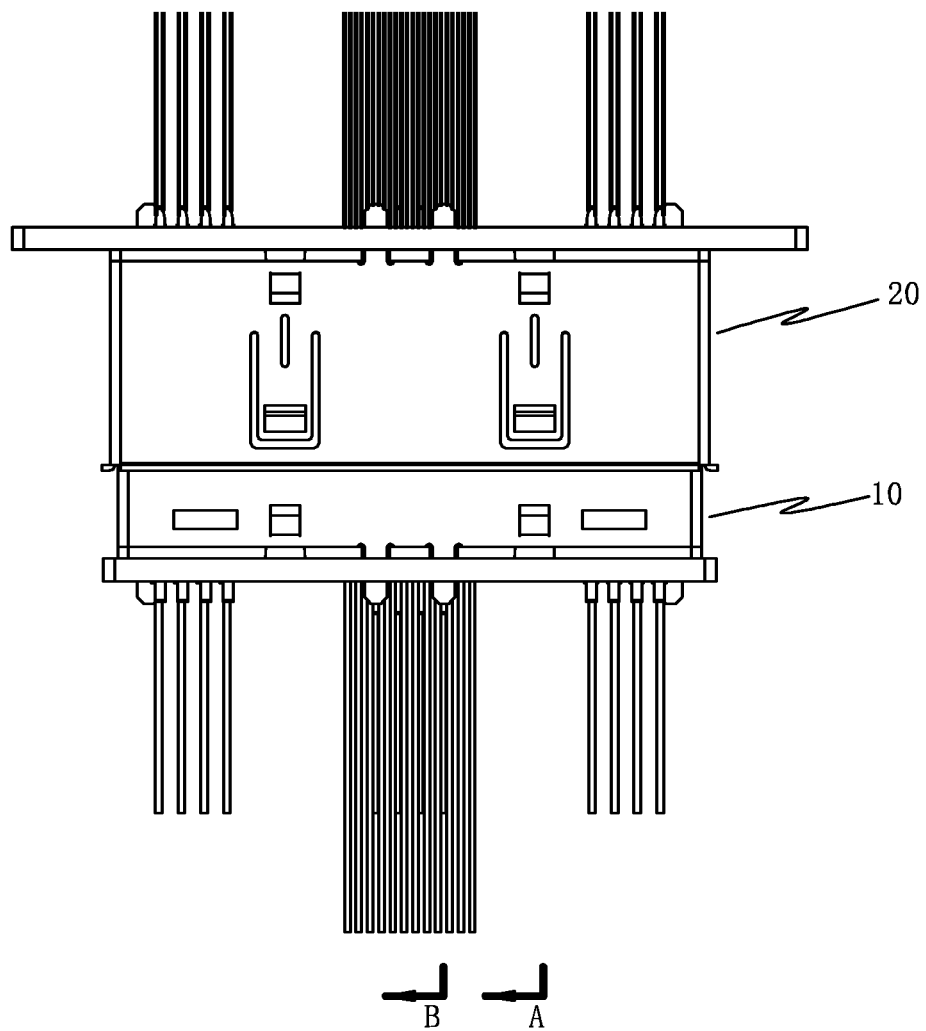
FIG. 15 is a schematic diagram showing that the male connector and the female connector are in an insertion-connected state.
Figure 16:
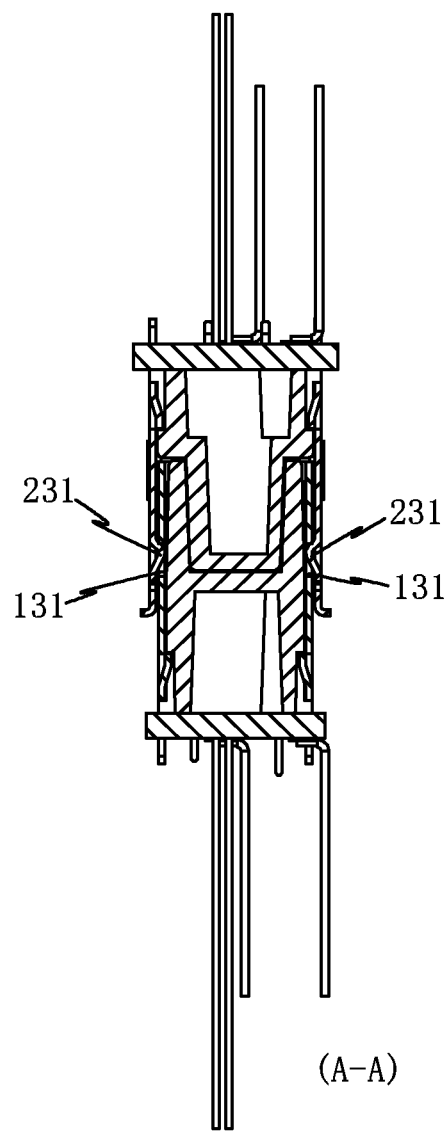
FIG. 16 is an A-A sectional diagram of FIG. 15.
Figure 17:
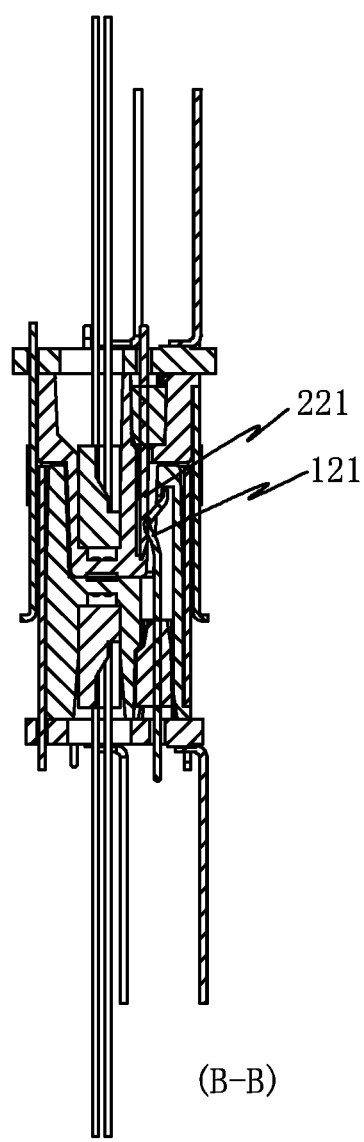
FIG. 17 is a B-B sectional diagram of FIG. 15.

FIG. 15 to FIG. 17 show that the male connector 20 and the female connector 10 are in an insertion-connected state, where FIG. 16 is an A-A sectional diagram of FIG. 15 and the FIG. 17 is a B-B sectional diagram of FIG. 15. It can be seen from FIG. 16 that, the fastening portion 131 and the fastening fit portion 231 are combined in an insertion-connected state, so that the male connector 20 and the female connector 10 maintain the insertion-connected state, thus avoiding unstable signals due to a loose fit between the insertion cavity 111 and the insertion protrusion 211. It can be seen from FIG. 17 that, the contact portions 121 of the metal elastic clips 12 press against the contact portions 221 of the metal pins 22 in the insertion-connected state. Thus, on one hand, electrical connection is realized to transmit electrical signals between the male connector 20 and the female connector 10. On the other hand, the metal elastic clips 12 produce an elastic force of firmly clamping the male connector 20, which can prevent the male connector 20 from shaking in the female connector 10, thus improving transmission stability of optical and electrical signals.

The foregoing pluggable free-space photoelectric hybrid connector at least has the following advantages:

1. Both optical signals and electrical signals can be transmitted.

2. The female connector 10 and the male connector 20 are optically connected through free space, and are both arranged with a lens for expanding light beams transmitted to each other. In this way, a light path is highly tolerant of dimensional tolerances and contaminants, so that the connector has high processing yield and high reliability.

3. Metal elastic clips 12 are used as electrodes to implement electrical signal transmission, and the top and bottom of the insertion cavity 111 are both disposed with the metal elastic clips 12, such that multiple sets of electrical signals can be transmitted. Moreover, the metal elastic clips 12 on the top and bottom produce an elastic force of firmly clamping the male connector 12 from the top and bottom two directions, which can prevent the male connector 20 from shaking in the female connector 10, thus improving transmission stability of the optical and electrical signals.

4. The metal housing is further provided, which, on one hand, can shield interference signals. On the other hand, the fastening portion 131 and the fastening fit portion 231 on the metal housing can make the male connector 20 and the female connector 10 maintain an insertion-connected state, thus avoiding unstable signals due to a loose fit between the insertion cavity 111 and the insertion protrusion 211.

5. Grooves 112 and projections 212 that fit into each other are disposed at the top and bottom of the insertion cavity 111, and the top and bottom of the insertion protrusion 211 respectively. During insertion, the lens of the male connector 20 and that of the female connector 10 can be precisely aligned by auxiliary guidance.

The present disclosure is described in detail above with specific embodiments. These detailed descriptions are merely used to help those skilled in the art understand the content of the present disclosure, and should not be construed as limiting the protection scope of the present disclosure. Various modifications and equivalent transformations made by those skilled in the art within the concept of the present disclosure shall fall within the protection scope of the present disclosure.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A pluggable free-space photoelectric hybrid female connector (10), comprising:
   a first insulating substrate (11), wherein an insertion cavity (111) is formed at a front end of the first insulating substrate (11), and a first fiber mounting hole (114) and first electrode mounting holes (113) are formed at a rear end of the first insulating substrate (11);
   a plurality of sets of metal elastic clips (12) mounted in the first electrode mounting holes (113) respectively, wherein contact portions (121) of at least one set of the metal elastic clips (12) are exposed from a top of the insertion cavity (111), and contact portions (121) of at least another set of the metal elastic clips (12) are exposed from a bottom of the insertion cavity (111);
   a first circuit board (16) mounted at the rear end of the first insulating substrate (11) and electrically connected to the plurality of sets of the metal elastic clips (12); and
   a first optical communication module, which comprises:
      a first optical fiber connector (141) disposed in the first fiber mounting hole (114) and configured to carry optical fibers; and
      a first lens (142) disposed at a back side of the insertion cavity (111), opposite to a light-emitting end of the first optical fiber connector (141), and configured to perform expansion processing on light beams transmitted from the female connector (10) to a male connector (20), wherein a position of the first lens (142) is arranged in such a manner that there is a distance (D) between the first lens (142) and a second lens (242) of the male connector (20) when the female connector (10) and the male connector (20) are in an insertion-connected state.

2. The female connector (10) according to claim 1, wherein a first metal housing (13) is provided outside the first insulating substrate (11), and is provided with a snap portion (131); and the snap portion (131) is configured in such a manner that the snap portion (131) is snapped and fitted with the male connector (20) in the insertion-connected state, so that the male connector (20) and the female connector (10) remain in the insertion-connected state.

3. The female connector (10) according to claim 1, wherein an insulating piece (122) is disposed at a middle of each set of the metal elastic clips (12), and is insertion-fitted into the corresponding first electrode mounting hole (113), so that the metal elastic clips (12) are mounted in the first electrode mounting hole (113).

4. The female connector (10) according to claim 3, wherein a rear end of each insulating piece (122) and a rear end of the first optical fiber connector (141) are both pressed against the first circuit board (16).

5. The female connector (10) according to claim 1, wherein a groove (112) extending in a plugging direction is disposed at the top and/or the bottom of the insertion cavity (111).

6. The female connector (10) according to claim 1, wherein the first lens (142) comprises one or more lenses integrally formed with the first insulating substrate (11).

7. A pluggable free-space photoelectric hybrid male connector (20), comprising:
   a second insulating substrate (21), wherein an insertion protrusion (211) is formed at a front end of the second insulating substrate (21) and a second fiber mounting hole (214) and second electrode mounting holes (213) are formed at a rear end of the second insulating substrate (21); and the insertion protrusion (211) is configured to match an insertion cavity (111) of a corresponding female connector (10);
   a plurality sets of metal pins (22) mounted in the second electrode mounting holes (213) respectively, wherein contact portions (221) of at least one set of the metal pins (22) are exposed from a top of the insertion protrusion (211), and contact portions (221) of at least another set of the metal pins (22) are exposed from a bottom of the insertion protrusion (211);
   a second circuit board (25) mounted at the rear end of the second insulating substrate (21) and electrically connected to the plurality of sets of the metal pins (22); and
   a second optical communication module, comprising:
      a second optical fiber connector (241) disposed in the second fiber mounting hole (214) and configured to carry optical fibers; and
      a second lens (242) disposed at a front side of the insertion protrusion (211), opposite to a light-emitting end of the second optical fiber connector (241), and configured to perform expansion processing on light beams transmitted from the male connector (20) to the female connector (10), wherein a position of the second lens (242) is arranged in such a manner that there is a distance (D) between the second lens (242) and a first lens (142) of the female connector (10) when the male connector (20) and the female connector (10) are in an insertion-connected state.

8. The male connector (20) according to claim 7, wherein a second metal housing (23) is provided outside the second insulating substrate (21), and is provided with a snap-fit portion (231); and the snap-fit portion (231) is configured to match a snap portion (131) on a first metal housing (13) of the corresponding female connector (10).

9. The male connector (20) according to claim 7, wherein an insulating piece (122) is disposed at the middle of each set of the metal pins (22), and is insertion-fitted into the corresponding second electrode mounting hole (213), so that the metal pins (22) are mounted in the second electrode mounting hole (213).

10. The male connector (20) according to claim 9, wherein a rear end of each insulating piece (122) and a rear end of the second optical fiber connector (241) are both pressed against the second circuit board (25).

11. The male connector (20) according to claim 7, wherein a projection (212) extending in a plugging direction is disposed at the top and/or the bottom of the insertion protrusion (211), and is configured to match a groove (112)

at the top and/or the bottom of the insertion cavity (111) of the corresponding female connector (10).

12. The male connector (20) according to claim 7, wherein the second lens (242) comprises one or more lenses integrally formed with the second insulating substrate (21).

* * * * *